United States Patent [19]

Parks

[11] Patent Number: 5,588,303
[45] Date of Patent: Dec. 31, 1996

[54] ARMORED VEHICLE SURFACE COOLING SYSTEM

[76] Inventor: Jeffery S. Parks, 21727 Harper Lake Ave., St. Clair Shores, Mich. 48080

[21] Appl. No.: 521,378

[22] Filed: Aug. 22, 1995

[51] Int. Cl.⁶ .............................. F28D 3/00; F02M 23/14
[52] U.S. Cl. .............................. 62/171; 62/244; 62/316; 261/153; 239/34
[58] Field of Search ................ 62/171, 244, 259.4, 62/316; 261/153; 239/34, 75

[56] References Cited

U.S. PATENT DOCUMENTS

| | | | |
|---|---|---|---|
| 4,761,965 | 8/1988 | Viner | 62/171 |
| 5,390,729 | 2/1995 | Sakurai et al. | 62/317 X |

FOREIGN PATENT DOCUMENTS

| | | | |
|---|---|---|---|
| 0266016 | 10/1989 | Japan | 62/259.4 |

*Primary Examiner*—William E. Waynew
*Attorney, Agent, or Firm*—Peter A. Taucher; David L. Kuhn

[57] ABSTRACT

A semi-passive cooling system for an armored vehicle includes an intermittent pressure source, an accumulator for storing pressurized fluid from the intermittent source, and a mechanism to control the pressure in the accumulator. The system also includes a water reservoir and automatic controls for stabilizing pressure in the reservoir at a level lower than the accumulator's pressure. A sheet of water-absorbent, wicking skin on an exterior zone of the vehicle receives pressurized water from the reservoir in response to signals from a heat sensor at the exterior zone. The sensors signals open a valve in a supply line connected between the reservoir and the sheet, the valve remaining open for a predetermined interval.

9 Claims, 3 Drawing Sheets

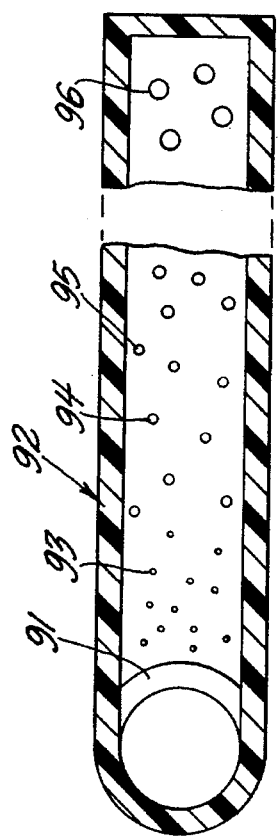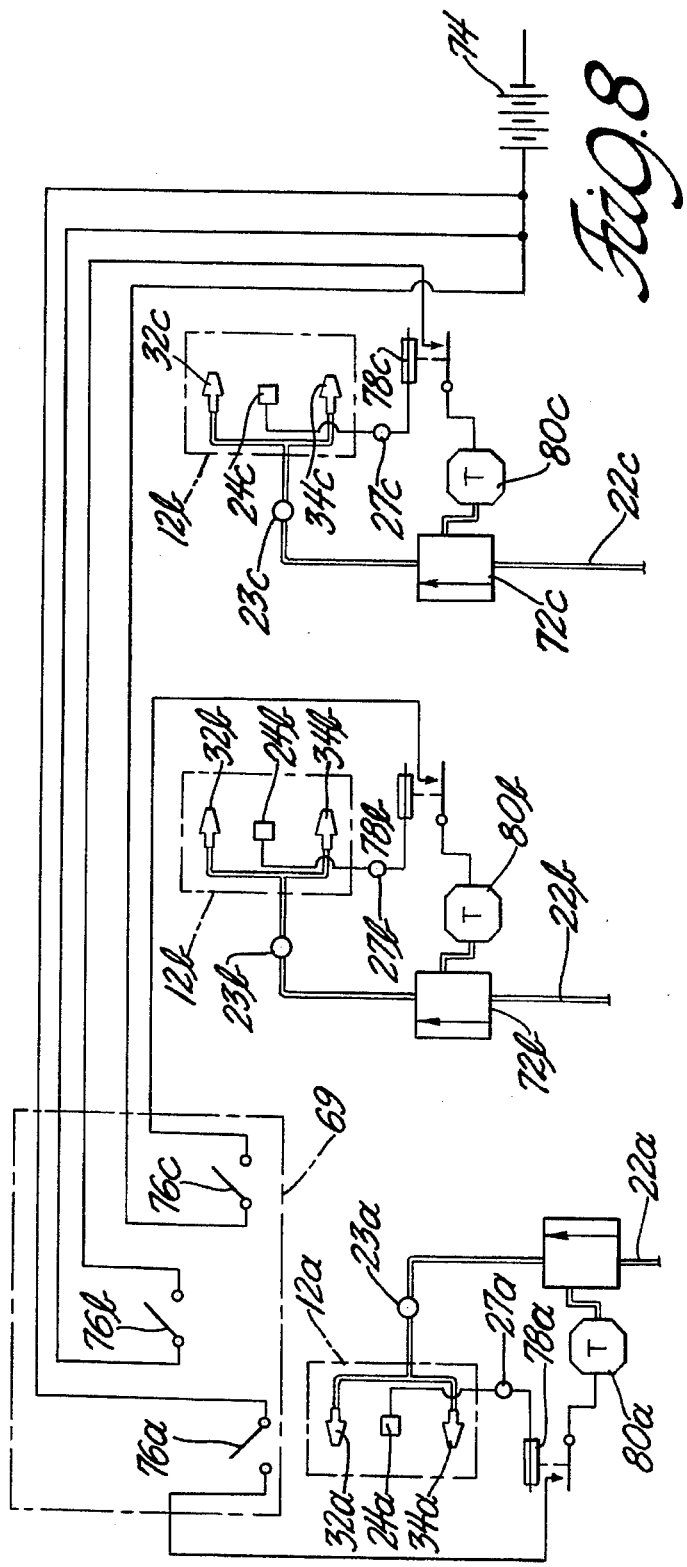

ARMORED VEHICLE SURFACE COOLING SYSTEM

The invention described here may be made, used and licensed by or for the U.S. Government for governmental purposes without paying me royalty.

BACKGROUND AND SUMMARY

One difficulty in operating a modern armored vehicle in warm climates is that the vehicle's interior heats up to temperatures in excess of 130 degrees. The vehicle must be cooled to protect the vehicle's crew members from heat exhaustion and allow them to perform their duties. Conventional internal cooling systems are generally ineffective for armored vehicles under hot, sunny conditions due to the great amount of energy they use to cool the vehicles' interiors. Conventional cooling systems also require the vehicle's so called "power pack" or propulsion system to run constantly.

To address the above difficulties, I propose a semi-passive cooling system driven by pressure generated from the power pack and then stored in an accumulator or pressure vessel for later use. Cooling the vehicle with the semi-passive system does not require the vehicle's power pack to run constantly. Also, the semi-passive cooling system uses only small amounts of power from the vehicle battery to operate the system's pressure sensors and thermal sensors.

The semi-passive cooling system can be regarded as having three basic elements. The first is a tough, wettable "wicking" skin comprised of sheets of fabric removably attached to external zones of the vehicle. The second element is a supply subsystem comprised of the pressure storage vessel, a pressurizable water reservoir and valved means to deliver pressurized water to individual sheets of the wicking skin. The third basic element is a control subsystem that governs water flow to the wicking skin in response to heat levels at the vehicle's exterior zones. The control subsystem also controls pressures for various components of the delivery subsystem.

During system operation, when an exterior zone reaches a given temperature, a thermal switch of the control subsystem will close and thereby actuate a timed hydraulic valve. The hydraulic valve allows water to flow to the appropriate sheet of wicking skin for a preset interval, whereupon the water disperses throughout the sheet and then evaporates to cool the exterior zone. When the exterior zone again heats up, the process is repeated.

BRIEF DESCRIPTION OF THE DRAWINGS

FIG. 6 is a sectional view of an optional delivery line structure for dispensing water to a sheet of wicking skin.

FIG. 8 is a schematic diagram of the semi-passive cooling system modified to allow control of plural sheets of wicking skin independently of one another so as to modify vehicle heat signature.

DETAILED DESCRIPTION

Figure 1:
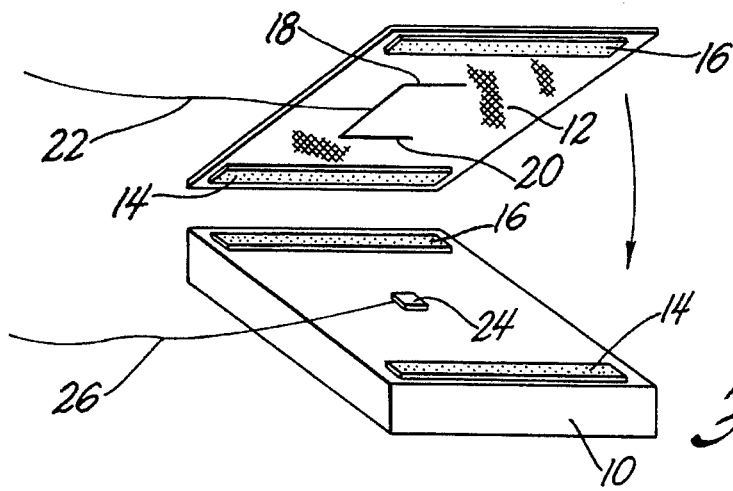
FIG. 1 and 2 show a plate from an armored vehicle's exterior, a sheet of wicking skin for the panel, water delivery lines for the sheet and a heat sensor for the panel.
Figure 2:
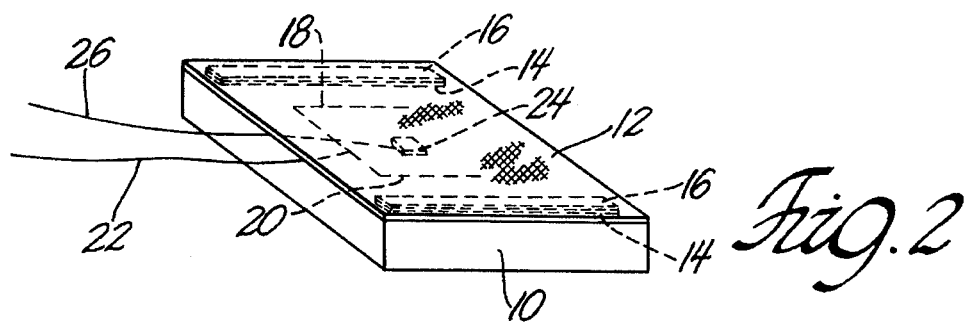
Figure 7:
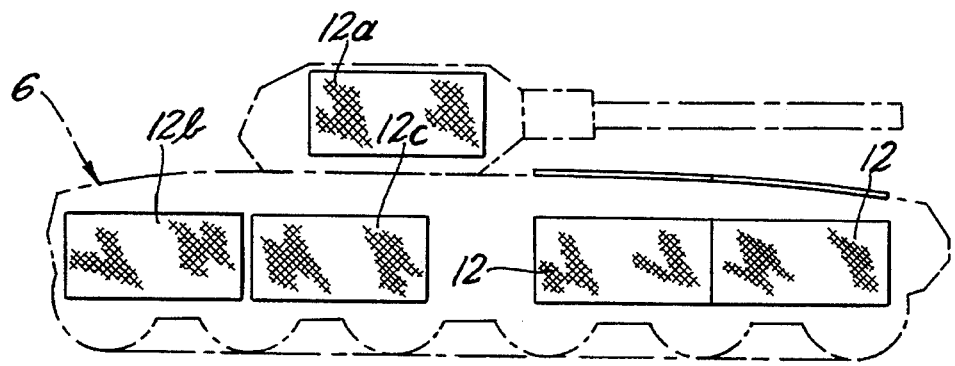
FIG. 7 shows locations of sheets of wicking skins on an armored vehicle.

In FIG. 1 is shown a panel 10 for the exterior zone of an armored vehicle such as a tank, panel 10 typically being a steel armor panel at least several inches thick, although panel 10 may be a structural or wall panel. A sheet 12 of tough, tear-resistant water absorbent skin is sized to cover panel 10 as shown in FIG. 2. Sheet 12 can be of cotton fabric, various carpet stocks, burlap-like mesh, synthetic fibers or any material strong in tension that wicks water and withstands repeated scuffing, abrasion and exposure to weather. Sheet 12 has Velcro strips 16 that mechanically and releasably adhere to complementary Velcro strips 14 on panel 10 so as to affix sheet 12 to panel 10. Various other means can be used to attach sheet 12 to panel 10 such as snaps, hooks or threaded fasteners, but Velcro units such as strips 14 and 16 are believed to be the most convenient. FIG. 7 shows typical locations of sheets 12, 12a, 12b and 12c on a military vehicle such as tank 6.

Again referring to FIGS. 1 and 2, there is attached to sheet 12 a pair of outlet lines 18 and 20, from which cooling water is supplied to the sheet. Lines 18 and 20 comprise the first stage of a mechanism to distribute water from line 22 over panel 10 or any other exterior zone of tank 6. Sheet 12 completes the distribution of water over panel 10 by absorbing water exiting lines 18 and 20 and then spreading or wicking the water all over panel 10. Lines 18 and 20 receive water from feeder line 22, which connects to a reservoir of pressurized water through a quick-release, snap fit coupling seen schematically at 23 in FIG. 4. It is preferred that lines 18 and 20 be disposed between sheet 12 and panel 10 as seen in FIG. 2, or else be interwoven with sheet 12 so as to be protected by the sheet, although lines 18 and 20 can lie atop the sheet. Coupling 23 allows easy mounting on, or removal of, sheet 12 from panel 10. Fixed to panel 10 but not normally attached to sheet 12 is one or more flat, thin heat sensors such as that shown at 24, and a signal line 26 runs from sensor 24 to a temperature controlled switch. Optionally, as schematically shown in FIG. 4, line 26 can have a quick-release connector at 27 if sensor 24 is fixed to sheet 12 and not panel 10.

Figure 3:
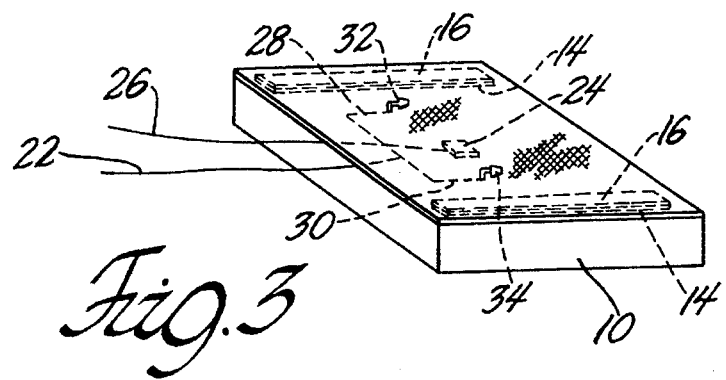
FIG. 3 shows a variation of the structure shown in FIGS. 1 and 2.

FIG. 3 shows a slight variation of the structure illustrated by FIGS. 1 and 2, wherein lines 28 and 30 replace outlet lines 18 and 20. Lines 28 and 30 have spray heads or nozzles 32 and 34 disposed so as to spray the outer surface of sheet 12. Analogously to the structure in FIG. 2, lines 28 and 30 and their nozzles are the first stage of the mechanism to distribute water over panel 10, while sheet 12 effects the second stage of this water distribution.

Figure 4:
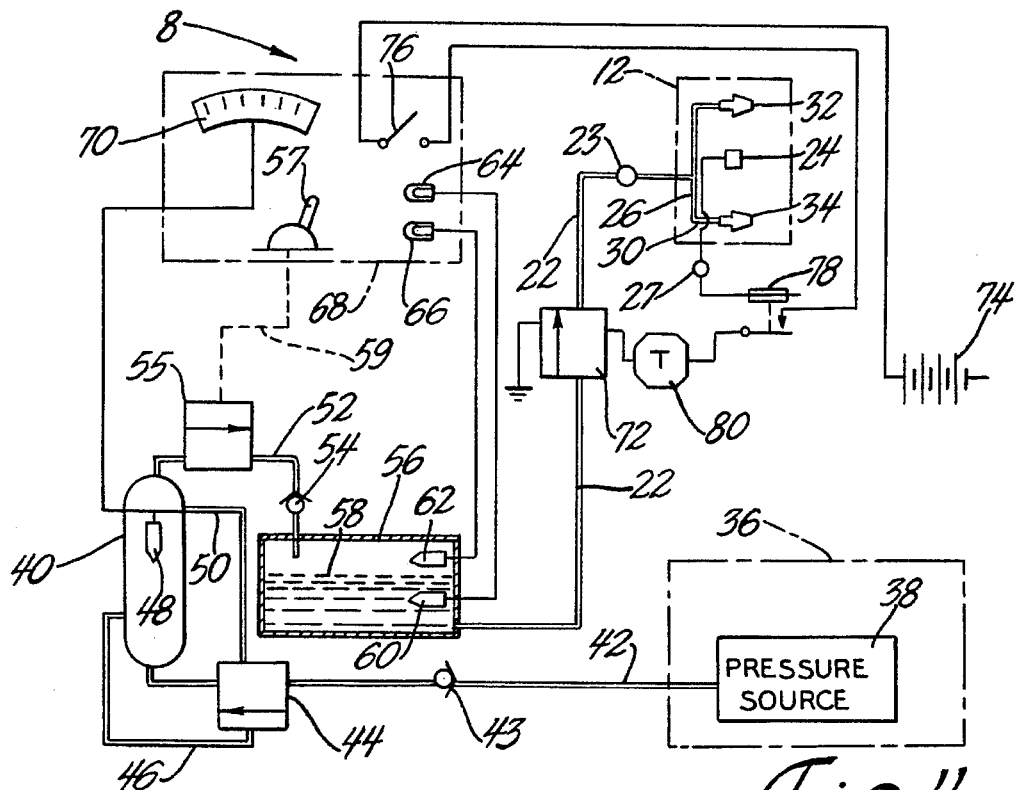
FIG. 4 is a schematic diagram of the semi-passive cooling system.

FIG. 4 is an overall schematic diagram of my semi-passive cooling system 8, where block 36 is a "power pack" which is typically a dressed turbine engine assembly or a dressed diesel engine assembly. Pressure source 38 is either a compressor driven by power pack 36 or a chamber pressurized directly by the engine. Under normal field conditions, the engine or power pack may be shut down for hours at a time, whereby pressure source is an interrupted or intermittent source. Consequently, it is desired to have vessel 40 where air under high pressure can be stored, so that pressure exists to drive water through nozzles 32 and 34 if power pack 36 is shut down. Pressure from source 38 is communicated to vessel 40 through air line 42, which is interrupted by a check valve 43. Valve 43 keeps fluid in vessel 40 from returning to pressure source 38 during the pressure source's down time or whenever the source's pressure is low. Line 42 is also interrupted by a pressure sensitive valve 44. Pressure in vessel 40 affects valve 44 via feedback line 46 such that if pressure in vessel 40 reaches a set ceiling level, valve 44 closes, but otherwise remains open. Valve 44 can be any of a variety of known pneumatically actuated air valves, or valve 44 can be an electronically actuated valve responsive to signals along line 50 from pressure sensor 48 in vessel 40. A gauge 70 in display panel 68 visually indicates the pressure level in vessel 40.

Pressure in vessel 40 communicates to water reservoir 56 via an exit line 52 which is interrupted by shut-off valve 55, this valve is typically operated by a manual control mechanism. Such a mechanism is lever 57 at display panel 68 acting through schematically represented mechanical linkage 59, lever 57 shutting valve 55, for example, when reservoir 56 is opened to add water. Line 52 is also interrupted by check valve 54, which prevents pressure loss in reservoir 56 should vessel 40 lose air. Associated with reservoir 56 is a suitable level detection means to determine if the level of water 58 therein is within desired limits. Such a means typically has sensor 60 which signals if water level is too low and sensor 62 which signals if water level is at the reservoir's maximum capacity, but any suitable known liquid level sensing device can be used. Respective lights 64 and 66 at display panel 68 will flash in response to signals from sensors 60 and 62.

Water is carried from reservoir 56 through line 22, which has an electric valve 72 therein powered by vehicle battery 74. Current to valve 72 can be discontinued by manual switch 76 at panel 68 or by switch 78 that closes in response to a signal from heat sensor 24. The current from battery 74 also passes through a circuit or timer 80 which passes current only for a given interval for each closure of switch 78, so that valve 72 opens for the given interval. Alternatively or additionally, timer 80 interrupts current to valve 72 for a at least a second interval once the first, given interval expires. It is contemplated that battery 74 can supply power to the various sensors, to valve 44, to lights 64 and 66, and to gauge 70 all in conventional fashion, the appropriate connecting lines in FIG. 4 and 5 being omitted to simplify those figures.

In operation, when sensor 24 detects a sufficiently high temperature, sensor 24 sends a signal that closes switch 78. If manual switch 76 is closed when the signal occurs, then current from battery 74 opens valve for an interval controlled by timer 80. During the interval, pressurized water flows from reservoir 56 to nozzles 32 and 34 and wets sheet 12, which absorbs and disperses the water and then dries to cool panel 10.

Figure 5:
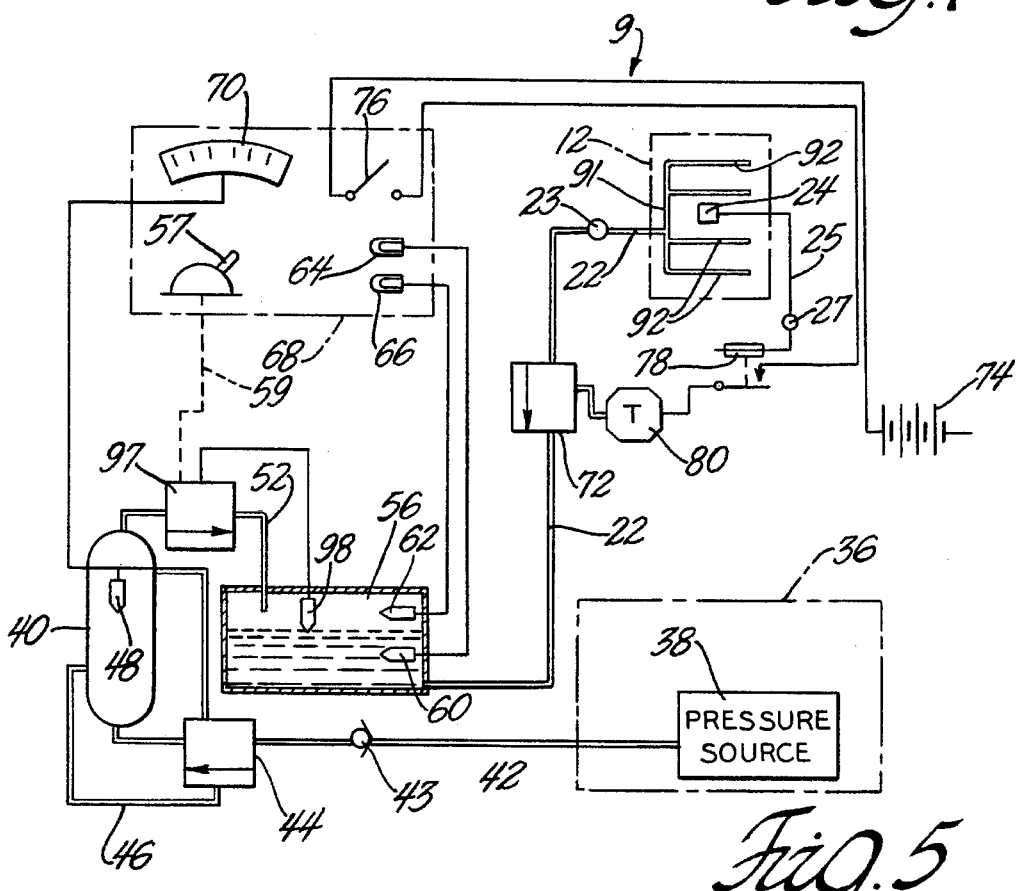
FIG. 5 is a schematic diagram of an alternate embodiment of the semi-passive cooling system.

FIG. 5 shows a second embodiment 9 of the cooling system wherein elements in common with the FIG. 4 embodiment have the same reference numerals. In FIG. 5, sheet 12 has a trunk line 91 woven into the sheet's fibers or fabric, trunk line 91 receiving water from feeder line 22. Trunk line 91 has a plurality of spur lines 92 that have perforations along their length as better seen in FIG. 6. The spur line's perforations are smallest near trunk line 91 and become increasingly larger at sites further from the trunk line, where water pressure decreases. The pattern of perforation sizes is exemplified by respective perforations 93, 94, 95 and 96. The increase in perforation size with distance from line 91 is intended to enhance balance in water outflow between the ends of the spur lines adjacent trunk line 91 and the ends of the spur lines distal from trunk line 91. More generally, the hole pattern of FIG. 6 effects or enhances balance in water outflow between any two axially spaced locations along the length of the spur lines, whereby sheet 12 is uniformly soaked or wetted.

Valve 97 in FIG. 5 replaces valve 55 of FIG. 4, and differs somewhat from valve 55 in that valve 97 closes in response to a signal from pressure sensor 98. Sensor 98 sends its signal when pressure in reservoir 56 rises to a predetermined level, and ceases sending its signal when pressure in the reservoir falls below that level. Valve 97 thus acts to stabilize pressure in reservoir 56 at the predetermined level, whereby the pressure to drive water through spur lines 92 is relatively constant.

FIG. 8 shows a plurality of sheets analogous to sheet 12 in FIG. 4, the sheets in FIG. 8 being designated as 12a, 12b and 12c respectively. Other elements in FIG. 8 that are analogous to elements in FIG. 4 likewise have a letter suffix. For example, sensors 24a, 24b and 24c all correspond to sensor 24 in FIG. 4 while nozzles 32a, 32b and 32c all correspond to nozzle 32. FIG. 8 illustrates how sheets 12a, 12b and 12c can be controlled independently of one another by means of switches 76a, 76b and 76c at a control panel 69. Sheets 12a, 12b and 12c can be located at different zones of the exterior of tank 6 as seen in FIG. 7, whereby the different zones can be cooled mutually independently. The independent cooling of the various zones will vary or disguise the infrared or heat signature of tank 6. That is, the characteristic appearance of tank 6 when viewed by infrared vision techniques will be altered, whereby tank 6 is less easily identified by an enemy.

I do not desire to be limited to the exact details of construction or method shown herein since obvious modifications will occur to those skilled in the relevant arts without departing from the spirit and scope of the following claims.

What is claimed is:

1. A semi-passive cooling system for an armored vehicle, comprising:

an intermittent pressure source on the vehicle;

means for storing pressurized fluid from the pressure source, the storing means comprised of a vessel downstream of the pressure source;

a first valve connected between the pressure source and the vessel;

first means to open the first valve in response to a predetermined pressure fall in the vessel;

a reservoir containing water;

a second valve connected between the vessel and the reservoir;

means for stabilizing pressure in the reservoir at a pressure lower than a pressure in the vessel, the stabilizing means including means to actuate the second valve in response to a predetermined pressure level in the reservoir:

a sheet of water-absorbent, wicking skin on an exterior zone of the vehicle;

means for causing releasable mechanical adhesion between the sheet and the zone;

means for feeding water from the reservoir to the sheet;

the feeding means including a third valve;

means for supplying power to the third valve;

means attached to the sheet for distributing water from the feeding means throughout the sheet;

a releasable fluid connection between the feeding means and the distributing means;

a heat sensor between the sheet and the zone;

a switch between the supplying means and the third valve, the switch responsive to a signal from the heat sensor.

2. The cooling system of claim 1 further including means connected electrically between the switch and the third valve for limiting time during which the third valve receives current for each closure of the switch.

3. The cooling system of claim 1 further including:

means to attach the sensor to the sheet;

a releasable connection between the sensor and the switch.

4. A semi-passive cooling system for an armored vehicle, comprising:

an intermittent pressure source on the vehicle;

means for storing pressurized fluid from the pressure source;

a reservoir containing water communicated to the storing means;

means for stabilizing pressure in the reservoir at a pressure lower than a pressure in the storing means:

means to carry water from the reservoir to an exterior zone of the vehicle;

the carrying means including a control valve;

distribution means connected to the carrying means for effecting a first stage of water distribution over the exterior zone;

dual-purpose means for protecting the effecting means and finishing the water distribution over the zone, the dual purpose means comprising a tough, water absorbent sheet covering the zone;

means for supplying power to the control valve;

a heat sensor between the sheet and the zone;

a switch between the supplying means and the control valve, the switch responsive to a signal from the heat sensor.

5. The cooling system of claim 4, further comprising:

a stabilizer valve connected between the storing means and the reservoir;

means to open the stabilizer valve when pressure in the reservoir falls below a preset threshold.

6. The cooling system of claim 4 wherein the distribution means comprises:

a line having a proximal end and a distal end, the proximal end communicated to the carrying means;

the line defining means for enhancing balance of fluid outflow between the proximal end and distal end, the enhancing means comprising a first set of holes and a second set of holes, the holes of the second set being larger than the holes of the first set, the second set of holes being nearer the distal end than the first set of holes.

7. The cooling system of claim 6 wherein the holes of the first set and the holes of the second set form part of a pattern of water exit holes disposed all along the line wherein exit hole size increases with distance from the proximal end.

8. A semi-passive system for cooling an armored vehicle and modifying the vehicle's infrared signature, comprising:

an intermittent pressure source on the vehicle;

means for storing pressurized fluid from the pressure source;

a reservoir containing water communicated to the storing means;

means for stabilizing pressure in the reservoir at a pressure lower than a pressure in the storing means:

a plurality of means to carry water from the reservoir to a plurality of exterior zones of the vehicle;

each of the carrying means including a control valve;

distribution means connected to the carrying means for effecting a first stage of water distribution over the exterior zones;

at each of the zones, a dual-purpose means for protecting the effecting means and finishing the water distribution over the zone, the dual purpose means comprising a tough, water absorbent sheet covering the zone;

means for supplying power to the control valves;

means for governing which of the exterior zones will be cooled, the governing means comprising independently actuatable selector switches in series with the control valves.

9. The cooling system of claim 8, further comprising:

heat sensors between the sheets and the zones;

for each control valve, a second switch between the supplying means and the control valve, the second switch responsive to a signal from one of the heat sensors.

* * * * *